Aug. 3, 1943.   J. P. WEED   2,325,926
WELDING ROD HOLDER
Filed March 30, 1942

INVENTOR.
J. P. WEED.
BY
H. A. Duckman
ATTORNEY.

Patented Aug. 3, 1943

2,325,926

UNITED STATES PATENT OFFICE 2,325,926

WELDING ROD HOLDER

Joseph P. Weed, Hawthorne, Calif.

Application March 30, 1942, Serial No. 436,739

6 Claims. (Cl. 219—8)

This invention relates to a novel welding rod holder, whereby a welding rod may be releasably held in the holder.

The prime object of my invention is to provide a novel welding rod wherein the gripping means for the welding rod may be released by swinging a portion of the holder, relative to the handle portion of said holder, and in turn gripping the welding rod by returning the swinging portion of the holder to its normal position, aligned with the handle portion.

Still another object of my invention is to provide a novel welding rod holder of the character stated, in which the rod receiving orifice in the holder may be adjusted to accommodate rods of different sizes.

A feature of my invention resides in the insulation and protection of the parts of the welding rod holder, thus protecting the operator and also preventing injury to the working parts of the holder.

A further feature of my invention is to provide a novel welding rod holder, which is simple in construction, inexpensive to manufacture, and which is compact and simple to operate.

Other objects, advantages and features of invention may appear from the accompanying drawing, the subjoined detailed description and the appended claims.

Figure 1:
Figure 1 is a side elevation of the plunger rod.
Figure 2:
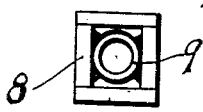
Figure 2 is an end view of the yoke and sleeve.

Referring more particularly to the drawing, my welding rod holder 1 comprises a handle portion 2 and a movable tip portion 3. A metal socket 4 is fixedly mounted in the handle portion 2, and is surrounded by an insulating sleeve 5. The forward portion of the sleeve 5 is cut at an angle, as shown at 6, and the purpose of this cut will be further described. The tip portion 3 includes an insulating sleeve 7, formed of a suitable insulating material, and surrounding a yoke 8 and a tube 9, fixedly mounted in, or attached to, the said yoke. A post 10 is fixedly attached to the socket 4 or may be an integral part of the socket if desired. The forward end of the post 10 is provided with a cam surface 11, the purpose of which will be further described. The yoke 8 is pivotally mounted on the post 10, by means of a pin 12. The yoke 8 is preferably box shaped in cross section, and a lip 13 on the yoke bears against the top of the post 10, when the portions 2, 3 are in alignment, thus holding the said portions in alignment and preventing the parts from moving past aligned positions.

Figure 3:
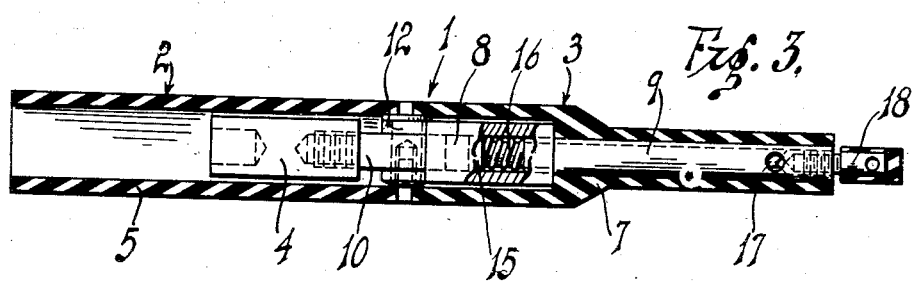
Figure 3 is a longitudinal sectional view of my holder, with parts broken away to show interior construction.
Figure 4:
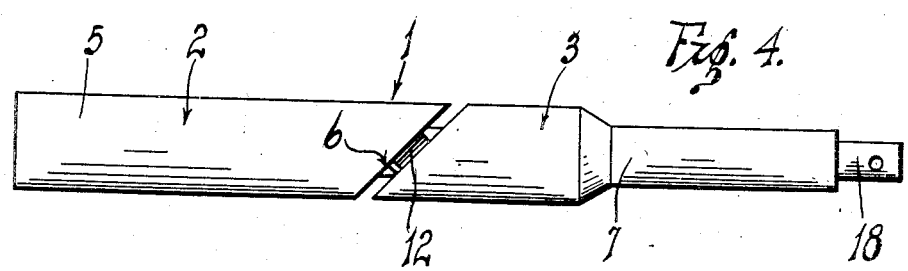
Figure 4 is a side elevation of my holder.
Figure 5:
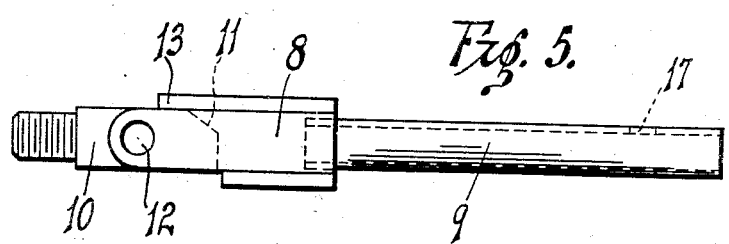
Figure 5 is a side elevation of the post and rod holding portion.
Figure 6:
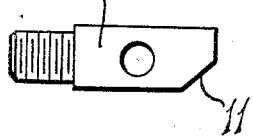
Figure 6 is a side elevation of the post.

A plunger rod 14 extends into the tube 9, and the head 15 thereof is positioned within the yoke 8. A coil spring 16 bears against the head 15 and against the inner end of the tube 9, thus urging the plunger rod into releasing position. The head 15 bears against the end of the post 10, and the cam surface 11 of this post permits the plunger rod to move inwardly, or into retracted position, when the tip portion 3 is swung downwardly on its pivot 12. A welding rod receiving hole 17 is drilled through the tube 9 and its insulating covering, and the outer end of the plunger rod 14 extends into this bore to engage the welding rod and clamp said welding rod to the holder. A stud 18 screws into the outer end of the tube 9 and also may extend into the bore 17 to adjust the size of this bore and permit welding rods of different sizes to be effectively clamped. The socket 4 receives an electrical cable in the usual and well-known manner, and this cable extends through the hollow handle portion 2 and thence to the socket 4. By swinging the tip portion 3 of the holder on its pivot 12, a welding rod may be inserted in the bore 17, and thereafter the tip is swung into aligned position, as shown in Figures 3 and 4. The welding rod is now securely held in the holder, and the usual welding operations may proceed.

Having described my invention, I claim:

1. A welding rod holder comprising a handle portion and a tip portion, said tip portion having a bore therein to receive a welding rod, means pivotally attaching the tip portion to the handle portion, a plunger rod in the tip portion and cam means engageable with the plunger rod and urging the outer end thereof into said bore to engage the welding rod.

2. A welding rod holder comprising a handle portion and a tip portion, said tip portion having a bore therein to receive a welding rod, means pivotally attaching the tip portion to the handle portion, a plunger rod in the tip portion and cam means engageable with the plunger rod and urging the outer end thereof into said bore to engage the welding rod, and spring means engaging the plunger rod and urging said plunger rod into retracted position, disengaging the welding rod.

3. A welding rod holder comprising a handle portion and a tip portion having a bore therein to receive a welding rod, means pivotally attaching the tip portion to the handle portion, a plunger rod slidably mounted in the tip portion, a cam on the handle portion engaging the inner end of the plunger rod and urging the outer end of said rod into said bore to engage the welding rod when the handle portion and tip portions are in alignment.

4. A welding rod holder comprising a handle portion and a tip portion having a bore therein to receive a welding rod, means pivotally attaching the tip portion to the handle portion, a plunger rod slidably mounted in the tip portion, a cam on the handle portion engaging the inner end of the plunger rod and urging the outer end of said rod into said bore to engage the welding rod when the handle portion and tip portions are in alignment, and spring means engaging the plunger rod and urging said plunger rod into retracted position, disengaging the welding rod.

5. A welding rod holder comprising a handle portion and a tip portion, said handle portion including a socket and a post extending from the socket, a cam surface on the outer end of the post, a yoke in the tip portion, said yoke being pivotally attached to the post, said tip portion having a bore therein to receive a welding rod, a plunger rod slidably mounted in the tip portion and extending into the yoke and engaging said cam surface, whereby the plunger rod is urged outwardly into said bore to engage the welding rod when the handle and tip portions are in alignment.

6. A welding rod holder comprising a handle portion and a tip portion, said handle portion including a socket and a post extending from the socket, a cam surface on the outer end of the post, a yoke in the tip portion, said yoke being pivotally attached to the post, said tip portion having a bore therein to receive a welding rod, a plunger rod slidably mounted in the tip portion and extending into the yoke and engaging said cam surface, whereby the plunger rod is urged into said bore to engage the welding rod when the handle and tip portions are in alignment, and spring means engaging the plunger rod and urging said plunger rod into retracted position, disengaging the welding rod.

JOSEPH P. WEED.